United States Patent
Tomeki

(10) Patent No.: US 10,988,005 B2
(45) Date of Patent: Apr. 27, 2021

(54) VEHICLE DOOR STRUCTURE AND METHOD FOR MANUFACTURING THE SAME

(71) Applicants: KABUSHIKI KAISHA TOYOTA JIDOSHOKKI, Kariya (JP); TOYOTA JIDOSHA KABUSHIKI KAISHA, Toyota (JP)

(72) Inventor: Masayuki Tomeki, Kariya (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 45 days.

(21) Appl. No.: 16/364,834

(22) Filed: Mar. 26, 2019

(65) Prior Publication Data

US 2019/0299757 A1 Oct. 3, 2019

(30) Foreign Application Priority Data

Mar. 28, 2018 (JP) .............................. JP2018-063278

(51) Int. Cl.
*B60R 1/06* (2006.01)
*B60J 5/04* (2006.01)

(52) U.S. Cl.
CPC ........... *B60J 5/0422* (2013.01); *B60J 5/0411* (2013.01); *B60J 5/0413* (2013.01); *B60J 5/0415* (2013.01); *B60J 5/0426* (2013.01); *B60R 1/06* (2013.01)

(58) Field of Classification Search
CPC ...... B60J 5/0422; B60J 5/0415; B60J 5/0411; B60J 5/0413; B60J 5/0426; B60J 5/0436; B60J 5/00404; B60R 1/06
See application file for complete search history.

(56) References Cited

U.S. PATENT DOCUMENTS

| 5,904,002 A * | 5/1999 | Emerling ............... B60J 5/0406 49/502 |
| 2004/0049989 A1 * | 3/2004 | Florentin ............... B60J 5/0463 49/502 |

FOREIGN PATENT DOCUMENTS

| JP | 2000-142227 A | 5/2000 |
| JP | 2006-321266 A | 11/2006 |
| JP | 2013-14209 A | 1/2013 |

* cited by examiner

*Primary Examiner* — Phi D A
(74) *Attorney, Agent, or Firm* — Sughrue Mion, PLLC

(57) ABSTRACT

A vehicle door structure includes a mirror retainer having a main body, which is joined to the front end of an outer reinforcement with a part of the main body overlapping with the outer reinforcement. The mirror retainer includes an upper leg, which has a first facing surface facing a lower leg and is joined to the inner panel. The lower leg has a second facing surface facing the upper leg and is joined to the inner panel. A reinforcing member is connected to the first facing surface and at least one of a main body inner surface and the second facing surface so as to reinforce the mirror retainer.

6 Claims, 6 Drawing Sheets

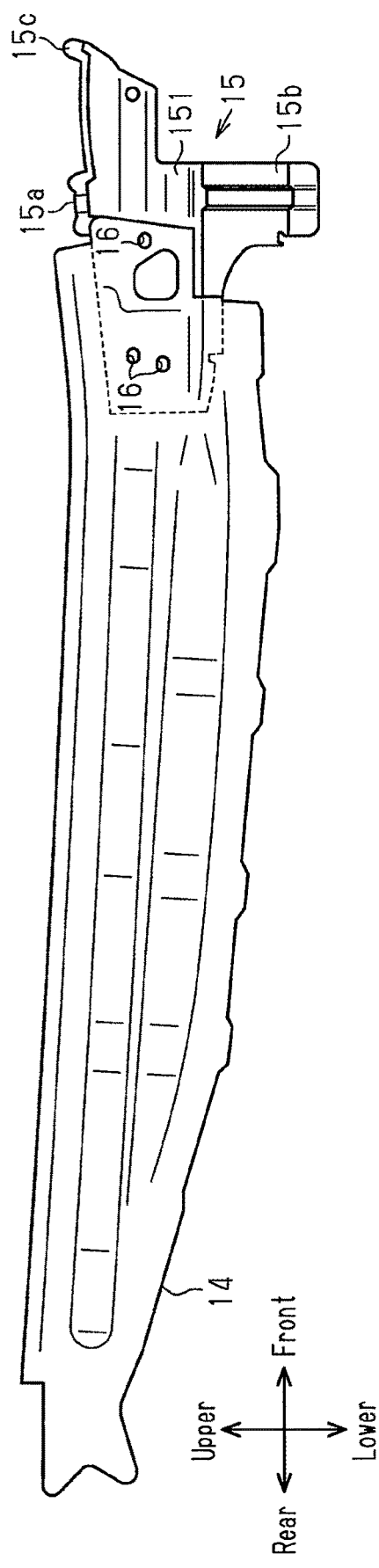
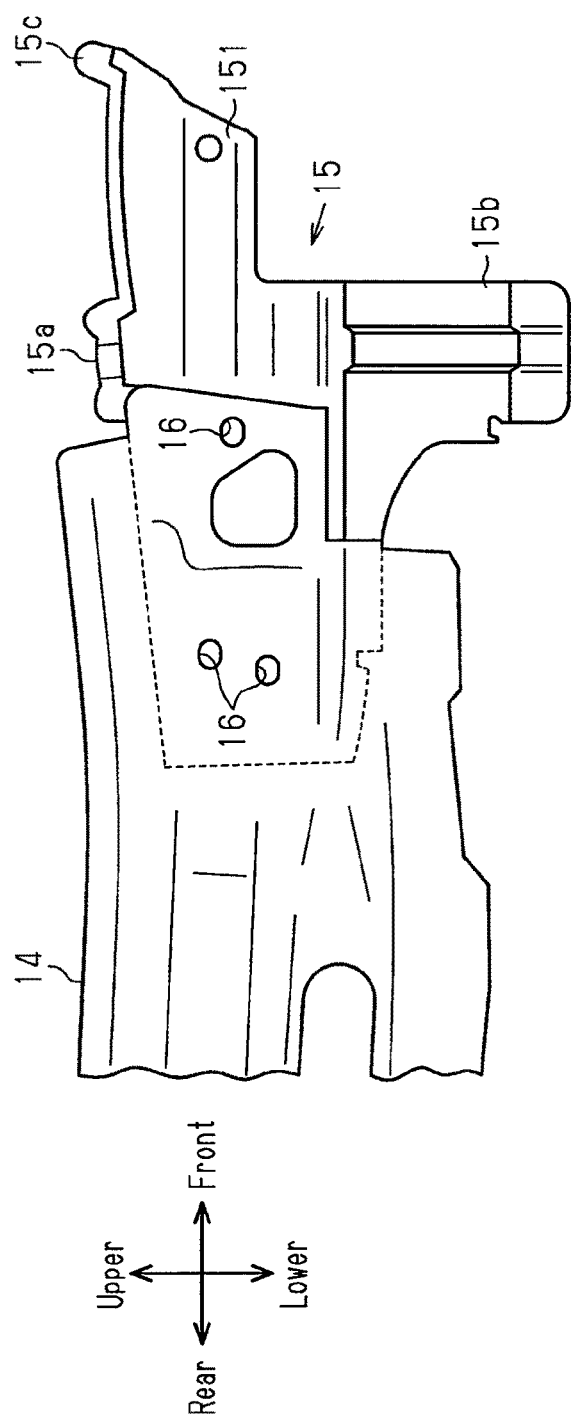
Fig.3A
Fig.3B

VEHICLE DOOR STRUCTURE AND METHOD FOR MANUFACTURING THE SAME

BACKGROUND

The present disclosure relates to a vehicle door structure and a method for manufacturing the same. More particularly, the present disclosure relates to a vehicle door structure in which an outer reinforcement having a front end connected to a mirror retainer is arranged inside an outer panel, and a method for manufacturing the same.

When the section of a vehicle door structure to which the base of a door mirror is coupled has an insufficient rigidity, the door mirror may vibrate in the up-down direction or the front-rear direction during traveling of the vehicle or opening and closing of the door.

FIG. 10 shows a vehicle door structure that is disclosed in Japanese Laid-Open Patent Publication No. 2006-321266 and has a door beltline outer reinforcement 52 extending along the door beltline of a door outer panel 51. A vertical reinforcement 53 extends in the up-down direction of the door. At the front end of the door beltline outer reinforcement 52, the upper edge of the vertical reinforcement 53 is spaced apart from the door inner panel 54 and located at the outer side of the door inner panel 54 in the vehicle width direction. The upper edge of the vertical reinforcement 53 is joined to the front end of the door beltline outer reinforcement 52. The above publication discloses a structure in which the coupling section of the coupling base 56 of the door mirror 55 is fixed to the upper edge of the vertical reinforcement 53. The publication describes that this structure increases the rigidity for holding the coupling base 56 of the door mirror 55.

The structure of the above publication is achieved by increasing the size of the upper section of the vertical reinforcement 53. Further, the front end of the door beltline outer reinforcement 52, which is spaced apart from and located at the outer side of the door inner panel 54, overlaps with the upper edge of the vertical reinforcement 53. This increases the weight of the vehicle door structure. In addition, it is not possible to enlarge the vertical reinforcement 53 when there is only a narrow gap (small space) between the door outer panel 51 and the door inner panel 54.

SUMMARY

It is an objective of the present disclosure to provide a vehicle door structure in which the section to which the base of a door mirror is coupled has a rigidity that is required to limit displacement of the door mirror in the up-down direction to a desirable degree even when there is only a narrow gap between the outer panel and the inner panel of the door, and a method for manufacturing the same. The rigidity is achieved while limiting an increase in weight of the vehicle door structure.

Examples of the present disclosure will now be described.

Example 1

A vehicle door structure is provided that includes an outer panel that includes a door beltline and is configured to form an exterior panel of a door, an inner panel that is configured to form an interior panel of the door, an outer reinforcement that extends along the door beltline of the outer panel and includes a front and a rear end, the rear end being joined to the inner panel, a mirror retainer that includes a main body, an upper leg, and a lower leg, and a reinforcing member. The main body is joined to the front end of the outer reinforcement with a part of the main body overlapping with the front end of the outer reinforcement. The main body includes an upper edge and a lower edge in a door up-down direction. The upper leg is located at the upper edge of the main body and joined to the inner panel. The lower leg is located at the lower edge of the main body and joined to the inner panel. The main body includes a main body inner surface on which the upper leg and the lower leg are located. The upper leg includes a first facing surface facing the lower leg. The lower leg includes a second facing surface facing the upper leg. The reinforcing member is connected to the first facing surface and at least one of the main body inner surface and the second facing surface so as to reinforce the mirror retainer.

This structure allows the section of the vehicle door structure to which the base of the door mirror is coupled to have a rigidity that is required to limit displacement of the door mirror in the up-down direction to a desirable degree even when there is only a narrow gap between the outer panel and the inner panel of the door. This is achieved while limiting an increase in weight of the vehicle door structure.

The section to which the base of a door mirror is coupled may include an outer reinforcement joined to the inner panel and a mirror retainer joined to the outer reinforcement. The outer reinforcement extends along the door beltline of the outer panel, and the rear end of the outer reinforcement is joined to the inner panel. The mirror retainer is joined to the front end of the outer reinforcement with a part of the mirror retainer overlapping with the front end of the outer reinforcement. The mirror retainer includes a pair of an upper leg and a lower leg, which is joined to the inner panel. To provide the section to which the base of the door mirror is coupled with a sufficient rigidity while reducing the vehicle weight, the mirror retainer is made thicker than the outer reinforcement.

To increase the rigidity of the section to which the base of a mirror retainer is coupled, the thickness of the outer reinforcement or the mirror retainer can be increased, or the cross-sectional shape of the outer reinforcement or the mirror retainer can be modified so as to obtain the required section modulus by bending the outer reinforcement or the mirror retainer into a corrugated shape without changing its thickness. However, the space for arrangement may limit bending of the reinforcement, for example, for modification of the cross-sectional shape. Further, an increased thickness of the reinforcement results in an increased thickness of the section that does not require an increased rigidity, increasing the weight of the vehicle door structure. The structure of Example 1 limits these problems.

Example 2

In the vehicle door structure of Example 1, the reinforcing member may be joined at least to the first facing surface and the second facing surface of the mirror retainer. The upper leg and the lower leg may face each other in a facing direction. The reinforcing member may be configured by a plate-shaped member having a bead extending in the facing direction.

In this structure, the reinforcing member effectively limits deformation of the upper leg, for example, toward the front, thereby effectively limiting displacement of the door mirror in the up-down direction.

Example 3

In the vehicle door structure of Example 1 or 2, the main body of the mirror retainer may include a main body rear end, which is a rear end in a door front-rear direction. The main body rear end may be joined to the outer reinforcement. A patch may be located at the main body rear end and extends over the outer reinforcement and the mirror retainer. The patch may be joined to the mirror retainer and the outer reinforcement.

The section modulus of the section of the outer reinforcement to which the main body of the mirror retainer is joined is the sum of the section modulus of the outer reinforcement and the section modulus of the main body of the mirror retainer. Thus, at the boundary between the section of the outer reinforcement to which the main body of the mirror retainer is joined and the section of the outer reinforcement to which the mirror retainer is not joined, the section modulus may vary abruptly. This may result in deformation of the section of the vehicle door structure to which the base of the door mirror is coupled, causing displacement of the door mirror in the front-rear direction. In contrast, in the structure of Example 3, the patch limits deformation of the section of the vehicle door structure to which the base of the door mirror is coupled, thereby limiting displacement of the door mirror in the front-rear direction.

Example 4

In the vehicle door structure of Example 3, the rear end of the main body of the mirror retainer may include a rear upper end, which is an upper section in the door up-down direction, and the patch at the main body rear end may cover at least the rear upper end of the main body.

In this structure, the patch further effectively limits displacement of the mirror in the front-rear direction.

Example 5

A reinforcement for a vehicle door structure is provided. The vehicle door structure includes an outer panel that includes a door beltline and is configured to form an exterior panel of a door, an inner panel that is configured to form an interior panel of the door, an outer reinforcement that extends along the door beltline of the outer panel and includes a front end and a rear end, the rear end being joined to the inner panel, and a mirror retainer that includes a main body, an upper leg, and a lower leg. The main body is joined to the front end of the outer reinforcement with a part of the main body overlapping with the front end of the outer reinforcement. The main body includes an upper edge and a lower edge in a door up-down direction. The upper leg is located at the upper edge of the main body and joined to the inner panel. The lower leg is located at the lower edge of the main body and joined to the inner panel. The main body of the mirror retainer includes a main body inner surface on which the upper leg and the lower leg are located. The upper leg of the mirror retainer includes a first facing surface facing the lower leg. The lower leg of the mirror retainer includes a second facing surface facing the upper leg. The reinforcing member is connected to the first facing surface and at least one of the main body inner surface and the second facing surface so as to reinforce the mirror retainer.

Example 6

A method for manufacturing a vehicle door structure is provided. The method includes: forming an exterior panel of a door with an outer panel that includes a door beltline; forming an interior panel of the door with an inner panel; joining a rear end of an outer reinforcement that extends along the door beltline of the outer panel to the inner panel; preparing a mirror retainer that includes a main body, an upper leg, and a lower leg; and joining the main body to the front end of the outer reinforcement with a part of the main body overlapping with the front end of the outer reinforcement. The main body includes an upper edge and a lower edge in a door up-down direction. The upper leg is located at the upper edge of the main body. The lower leg is located at the lower edge of the main body. The main body includes a main body inner surface on which the upper leg and the lower leg are located. The upper leg includes a first facing surface facing the lower leg. The lower leg includes a second facing surface facing the upper leg. The method further includes: joining the upper leg to the inner panel; joining the lower leg to the inner panel; connecting the reinforcement to the first facing surface; and connecting the reinforcing member to at least one of the main body inner surface and the second facing surface so as to reinforce the mirror retainer.

The present disclosure allows the section to which the base of a door mirror is coupled has a rigidity that is required to limit displacement of the door mirror in the up-down direction to a desirable degree even when there is only a narrow gap between the outer panel and the inner panel of the door. This is achieved while limiting an increase in weight of the vehicle door structure.

Other aspects and advantages of the present disclosure will become apparent from the following description, taken in conjunction with the accompanying drawings, illustrating exemplary embodiments.

BRIEF DESCRIPTION OF THE DRAWINGS

The disclosure may be understood by reference to the following description together with the accompanying drawings:

FIG. 3A is a front view showing the outer reinforcement to which the mirror retainer is coupled in the vehicle door structure in FIG. 2;

FIG. 3B is a partial enlarged view of FIG. 3A;

DETAILED DESCRIPTION

First Embodiment

Referring to FIGS. 1 to 7A, a vehicle door structure according to a first embodiment of the present disclosure is now described. FIG. 7B shows a comparative example.

Figure 1:
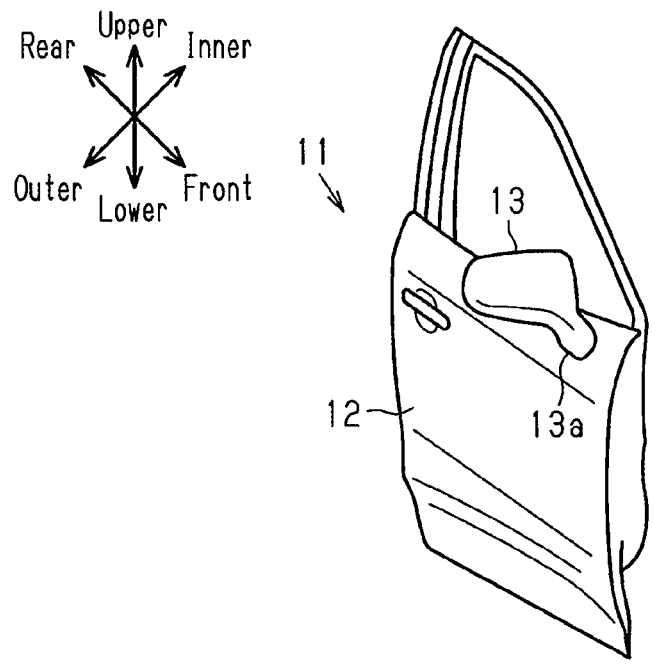
FIG. 1 is a side view showing a front door.

As shown in FIG. 1, a door mirror 13 is mounted on the outer surface of the outer panel 12 of a vehicle door (a front door) 11 at the front end. The door mirror 13 has a base 13a coupled to the outer panel 12.

Figure 2:
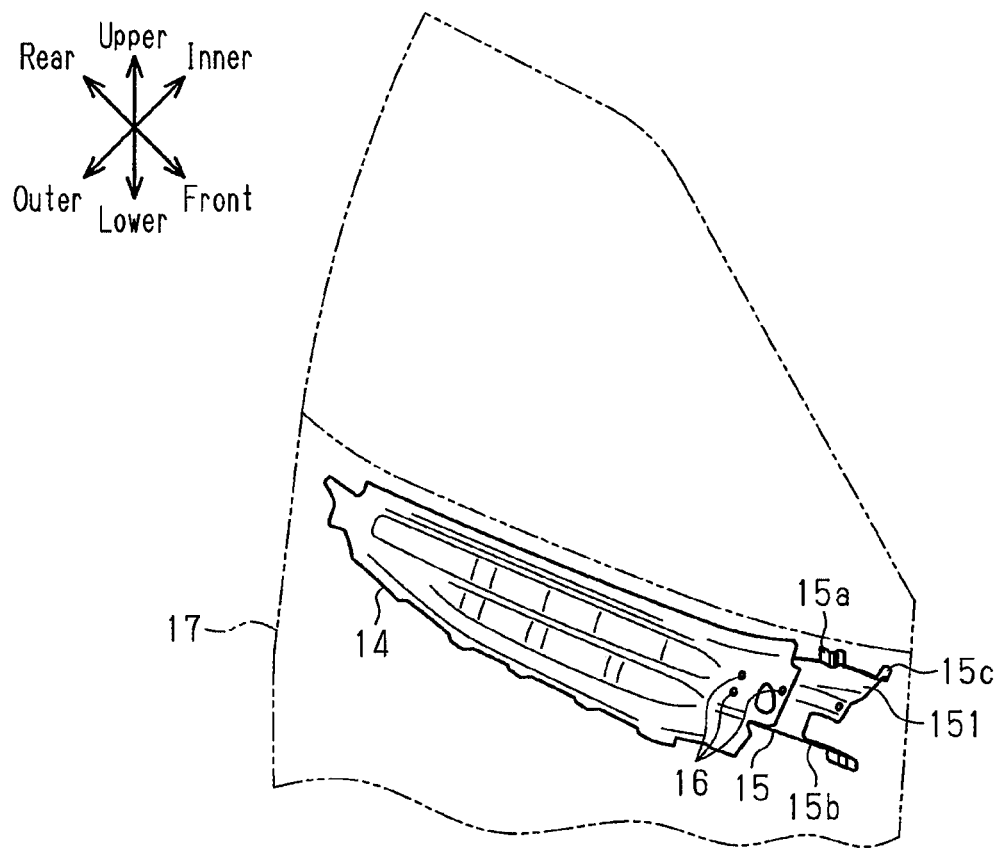
FIG. 2 is a perspective view schematically showing the fastening targets of a vehicle door structure according to one embodiment of the present disclosure.

As shown in FIGS. 2 and 3A, an outer reinforcement 14 and a mirror retainer 15 are coupled to each other. The outer reinforcement 14 extends along the door beltline of the outer panel 12. Specifically, the mirror retainer 15 is joined to the outer reinforcement 14 with a part of the mirror retainer 15 overlapping with the front end of the outer reinforcement 14. The mirror retainer 15 is joined to the outer reinforcement 14 such that the section of the outer reinforcement 14 that overlaps with the mirror retainer 15 is located closer to the outer panel 12 than the mirror retainer 15. That is, the section of the outer reinforcement 14 that overlaps with the mirror retainer 15 is located between the mirror retainer 15 and the outer panel 12. The base 13a of the door mirror 13 is fixed by bolts (not shown) inserted in holes 16 formed in the section where the outer reinforcement 14 overlaps with the mirror retainer 15. That is, the outer reinforcement 14 and the mirror retainer 15 are the fastening targets to which the base 13a of the door mirror 13 is fastened.

As shown in FIGS. 3A and 3B, the mirror retainer 15 includes a plate-shaped main body 151. The main body 151 is joined to the front end of the outer reinforcement 14 with a part of the main body 151 overlapping with the front end of the outer reinforcement 14. The mirror retainer 15 also includes an upper leg 15a at the upper edge in the door up-down direction of the main body 151 and a lower leg 15b at the lower edge in the door up-down direction of the main body 151. The mirror retainer 15 further includes a front leg 15c extending substantially parallel to the upper leg 15a from the front end of the upper edge of the main body 151.

The legs 15a, 15b and 15c are located in sections of the mirror retainer 15 that are farther from the outer reinforcement 14 than the section where the mirror retainer 15 is joined to the outer reinforcement 14. The upper leg 15a and the front leg 15c extend inward of the vehicle relative to the surface where the mirror retainer 15 is joined to the outer reinforcement 14. The lower leg 15b is positioned such that the distance between the lower leg 15b and the upper leg 15a increases toward the distal end of the lower leg 15b.

As shown in FIG. 2, the outer reinforcement 14 is joined to the inner panel 17 at the rear end of the outer reinforcement 14. The mirror retainer 15 is joined to the inner panel 17 at the distal ends of the legs 15a, 15b and 15c. The inner panel 17 forms the interior panel of the door 11, and the outer panel 12 forms the exterior panel of the door 11.

Figure 4:
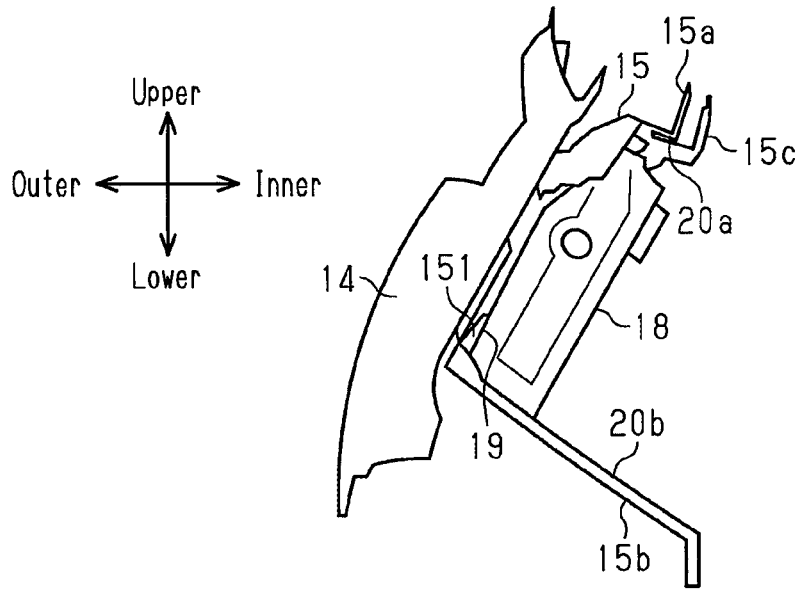
FIG. 4 is a perspective view schematically showing how a reinforcing member is coupled in the vehicle door structure in FIG. 3B.
Figure 5:
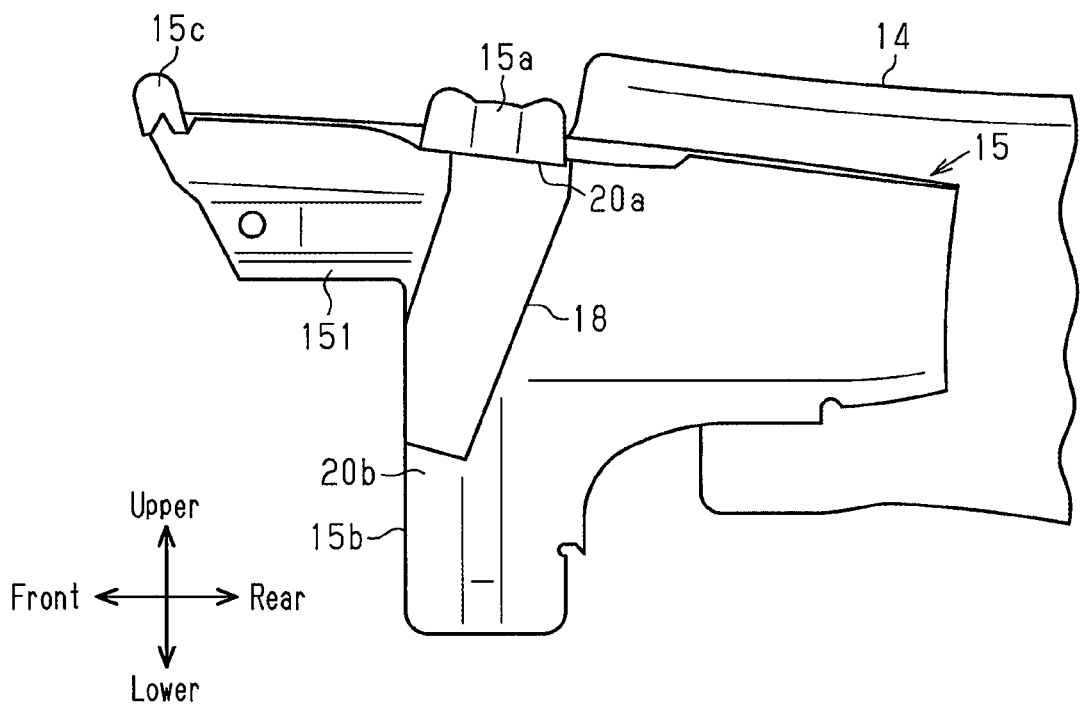
FIG. 5 is a front view showing the position of the reinforcing member in the vehicle door structure in FIG. 4.

As shown in FIGS. 4 and 5, a reinforcing member 18 is joined to the mirror retainer 15. The upper leg 15a includes a first facing surface 20a, which faces the lower leg 15b, and the lower leg 15b includes a second facing surface 20b, which faces the upper leg 15a. The main body 151 has a main body inner surface 19, on which the upper leg 15a and the lower leg 15b are located. The reinforcing member 18 is connected to the three surfaces of the first facing surface 20a, the second facing surface 20b, and the main body inner surface 19 of the mirror retainer 15.

Figure 6A:
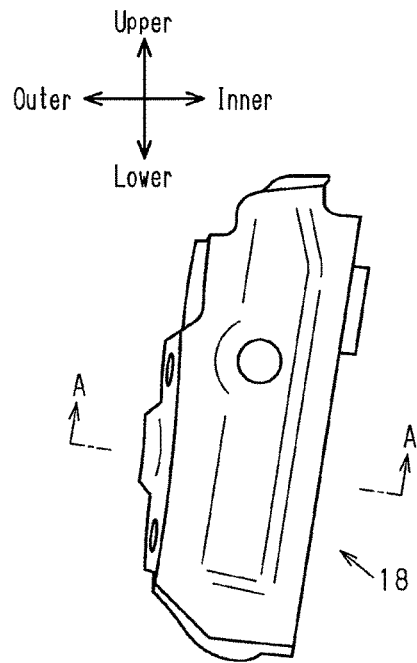
FIG. 6A is a side view showing the reinforcing member in FIG. 4.
Figure 6B:
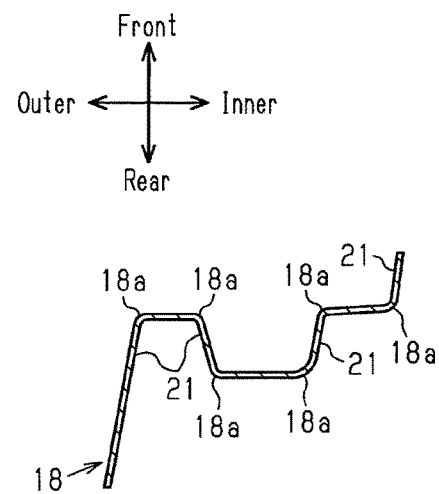
FIG. 6B is a schematic cross-sectional view taken along line A-A in FIG. 6A.

As shown in FIGS. 6A and 6B, a reinforcing member 18 is formed by bending a metal plate so that its cross-sectional shape includes beads 21. As shown in FIG. 6B, the reinforcing member 18 has six bends 18a. The reinforcing member 18 is positioned such that the beads 21 extend in a direction that intersects the first facing surface 20a of the upper leg 15a and the second facing surface 20b of the lower leg 15b. When the upper leg 15a and the lower leg 15b face each other in a facing direction, the beads 21 extend in this facing direction of the upper and lower legs 15a and 15b.

An operation of the above-described vehicle door structure will be described.

When the door mirror 13 vibrates during traveling of the vehicle or opening and closing of the door 11, the degree of vibration of the door mirror 13 depends on the rigidity of the base 13a of the door mirror 13, the rigidity of the outer reinforcement 14 and the mirror retainer 15, which are the fastening targets to which the base 13a is fastened, and the rigidity of the joint section between the fastening targets and the door 11.

In the vehicle door structure of the embodiment, the mirror retainer 15 is joined to the outer reinforcement 14 with the rear end (a part) of the main body 151 overlapping with the front end of the outer reinforcement 14. The reinforcing member 18 is joined to the main body inner surface 19, the first facing surface 20a of the upper leg 15a, and the second facing surface 20b of the lower leg 15b of the mirror retainer 15, which is joined to the outer reinforcement 14 as described above. Thus, the space between the upper leg 15a and the lower leg 15b of the mirror retainer 15 accommodates the reinforcing member 18. This eliminates the need for the vehicle door structure to have an additional space for the reinforcing member 18. The reinforcing member 18 is not merely a thick plate but has a shape including a plurality of bends 18a and the beads 21. Accordingly, the reinforcing member 18 does not have to be very thick to have a high rigidity. The placement of the reinforcing member 18 allows the section to which the base 13a of the door mirror 13 is coupled to have a rigidity that is required to limit displacement of the door mirror 13 in the up-down direction to a desirable degree. In other words, the rigidity required to limit displacement of the door mirror 13 is given to the section where the outer reinforcement 14 overlaps with the mirror retainer 15 and in which the holes 16 are formed to receive the bolts to fix the base 13a to the outer reinforcement 14 and the mirror retainer 15.

If the outer reinforcement 14 and the mirror retainer 15 are made thicker instead of arranging the reinforcing member 18 to achieve an effect equivalent to that of the reinforcing member 18, the vehicle door structure would be heavier than the structure including the reinforcing member 18. In view of weight reduction of the vehicle, the outer reinforcement 14 and the mirror retainer 15 should not be thicker. In contrast to the above publication, the present embodiment allows the section to which the base 13a of the door mirror 13 is coupled (the outer reinforcement 14 and the mirror retainer 15) to have the required rigidity even when there is only a narrow gap between the outer panel 12 and the inner panel 17 of the door 11. This is achieved while limiting an increase in weight of the vehicle door structure.

Figure 7A:
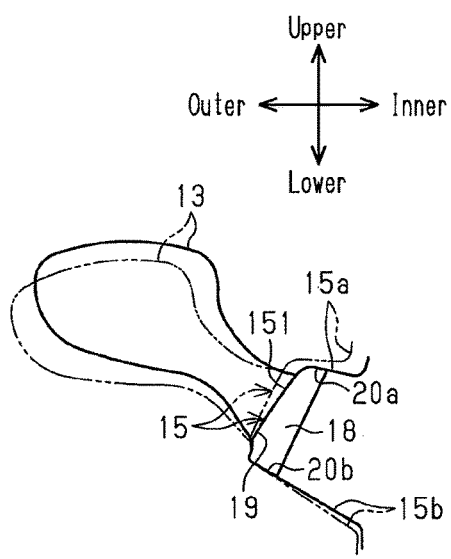
FIG. 7A is a schematic view showing a deformed state of a vehicle door structure with a reinforcing member.
Figure 7B:
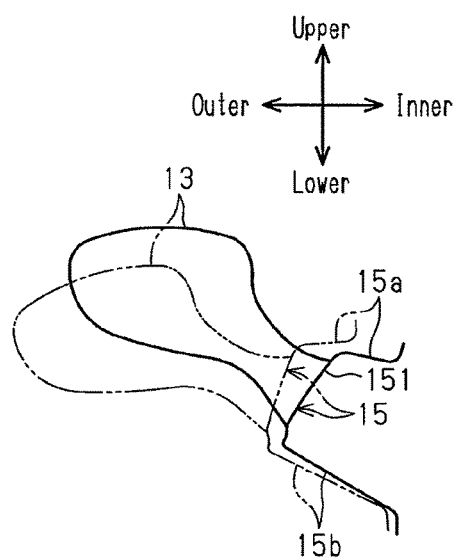
FIG. 7B is a schematic view showing a deformed state of a vehicle door structure without a reinforcing member as a comparative example.

FIGS. 7A and 7B schematically show deformation of the mirror retainer 15 and displacement of the door mirror 13 in a structure with the reinforcing member 18 and a structure without the reinforcing member 18. As shown in FIG. 7B, when the reinforcing member 18 is not provided, the mirror retainer 15 will deform significantly, and the door mirror 13 will be significantly displaced in the up-down direction. In contrast, as shown in FIG. 7A, when the reinforcing member 18 is provided, the deformation of the mirror retainer 15 and the displacement of the door mirror 13 in the up-down direction are reduced. The reinforcing member 18 is positioned to extend in the facing direction of the upper leg 15a and the lower leg 15b so that the beads 21 extend in a direction intersecting the first facing surface 20a of the upper leg 15a and the second facing surface 20b of the lower leg 15b. This further reduces the deformation of the mirror retainer 15. In FIGS. 7A and 7B, the solid lines indicate the states of the mirror retainer 15 and the door mirror 13 before deformation, and the dotted lines indicate the deformed states.

The present embodiment has the following advantages.

(1) The vehicle door structure includes the reinforcing member 18, which is joined to the first facing surface 20a of the upper leg 15a, the second facing surface 20b of the lower leg 15b, and the main body inner surface 19 of the mirror retainer 15. The reinforcing member 18 has a cross-sectional shape including beads 21. This allows the section to which the base 13a of the door mirror 13 is coupled (the outer reinforcement 14 and the mirror retainer 15, which are the fastening targets) to have the required rigidity even when there is only a narrow gap between the outer panel 12 and the inner panel 17 of the door 11. This is achieved while limiting an increase in weight of the vehicle door structure. As compared with a structure that requires the outer reinforcement 14 or the mirror retainer 15 to be thicker, for example, the present embodiment provides the necessary rigidity with a smaller increase in weight.

(2) The reinforcing member 18 is joined to three surfaces of the mirror retainer 15 in total, which are the first facing surface 20a of the upper leg 15a, the second facing surface 20b of the lower leg 15b, and the main body inner surface 19 of the main body 151. As compared with a structure in which the reinforcing member 18 is joined only to the pair of the upper first facing surface 20a and the lower second facing surface 20b and a structure in which the reinforcing member 18 is joined only to the two surfaces of the first facing surface 20a of the upper leg 15a and the main body inner surface 19 of the main body 151, for example, the present embodiment effectively limits deformation of the upper leg 15a toward the front. This, in turn, effectively limits displacement of the door mirror 13 in the up-down direction.

(3) The beads 21 extend in a direction intersecting the pair of the upper first facing surface 20a and the lower second facing surface 20b, so that the reinforcing member 18 is positioned such that the beads 21 extend in the direction in which the upper leg 15a and the lower leg 15b face each other. This further limits deformation of the mirror retainer 15.

Second Embodiment

Figure 8:
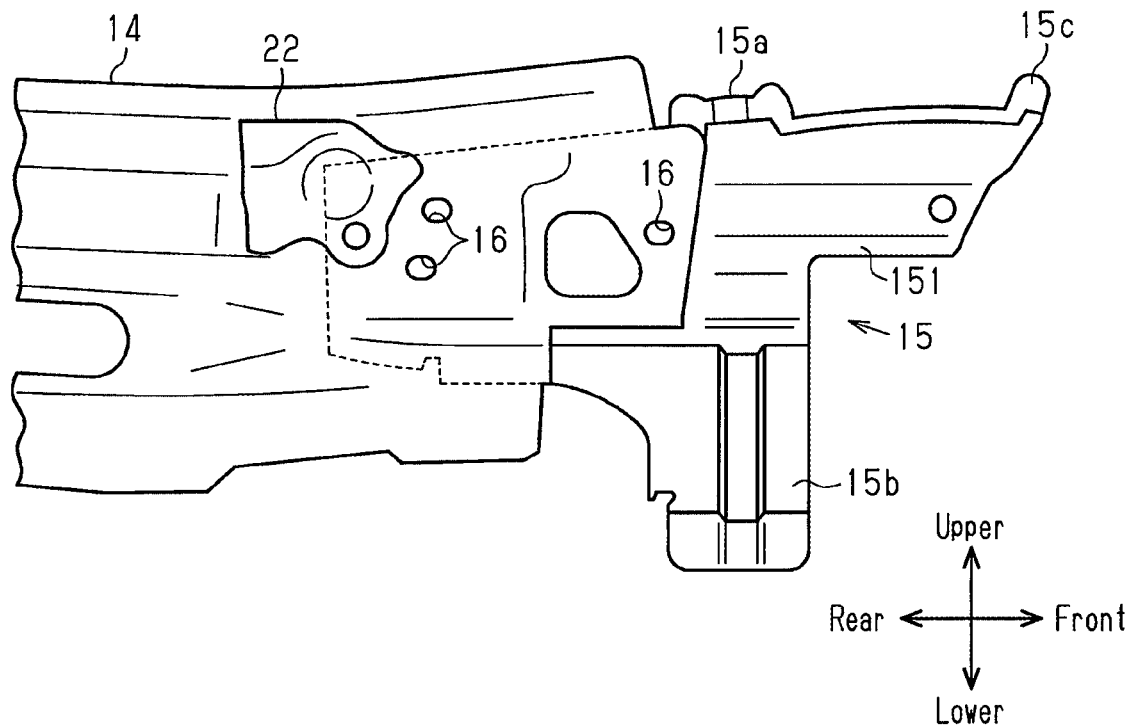
FIG. 8 is a partial enlarged view corresponding to FIG. 3B and showing a vehicle door structure of a modification in which a patch is added to the first embodiment.
Figure 9A:
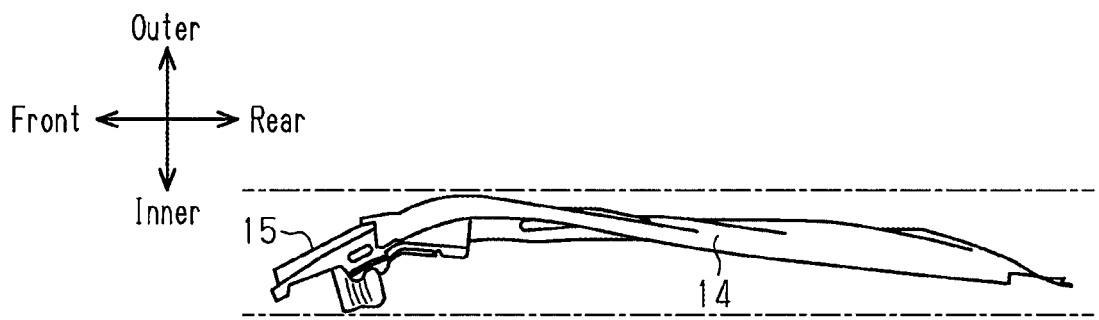
FIG. 9A is a schematic view showing a deformed state of a vehicle door structure with the patch shown in FIG. 8.
Figure 9B:
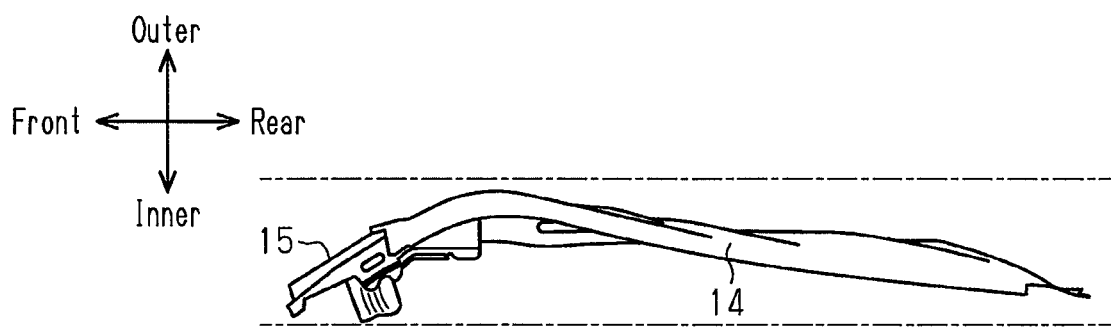
FIG. 9B is a schematic view showing a deformed state of a vehicle door structure without a patch.
Figure 10:
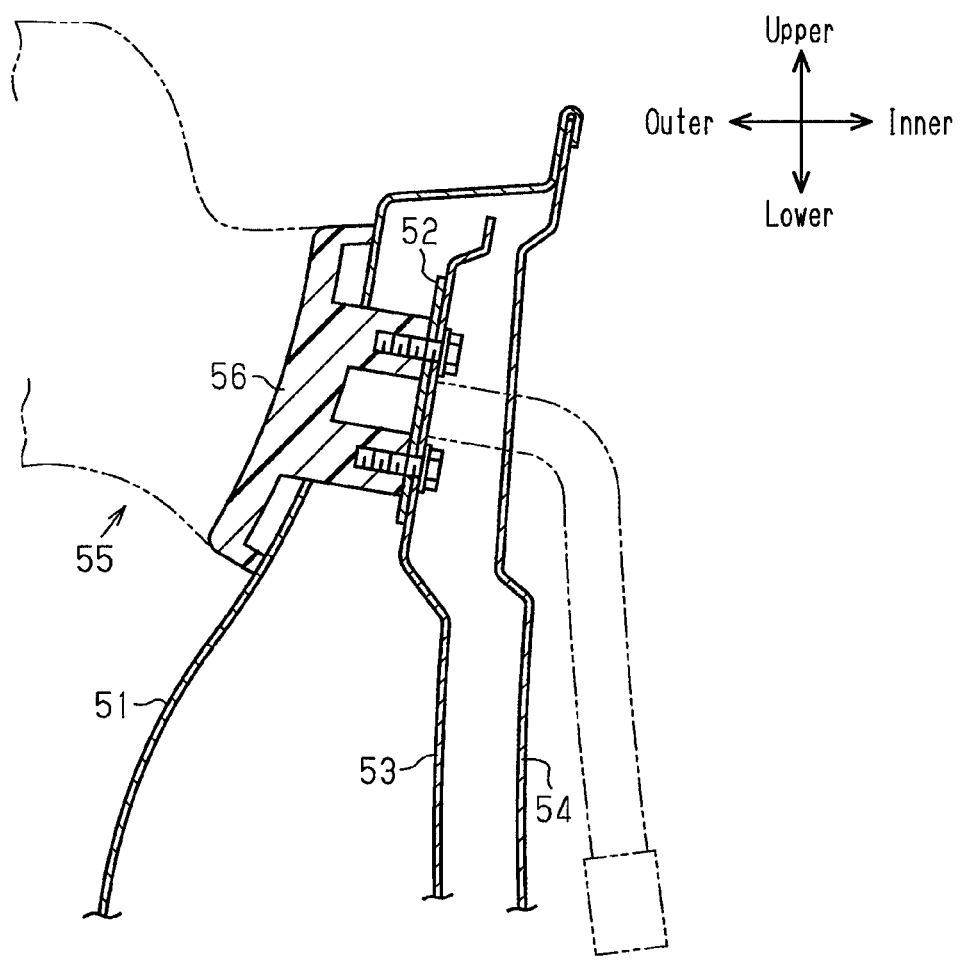
FIG. 10 is a cross-sectional view showing how a door mirror is coupled to a conventional vehicle door structure.

Referring to FIGS. 8 and 9A, a vehicle door structure according to a second embodiment of the present disclosure is now described. FIG. 9B shows a comparative example of FIG. 9A. As shown in FIG. 8, the second embodiment has the reinforcing member 18 but differs from the first embodiment in that a patch 22 is joined to and extends over the outer reinforcement 14 and the mirror retainer 15.

As shown in FIG. 8, the patch 22 is joined to the rear end in the door front-rear direction of the main body 151. The rear end of the main body 151 of the mirror retainer 15 is joined to the outer reinforcement 14. The patch 22 is welded to the outer reinforcement 14 at four positions. The four positions include two positions in the section where the outer reinforcement 14 overlaps with the mirror retainer 15 and two positions in the section where the outer reinforcement 14 does not overlap with the mirror retainer 15. The rear end of the main body 151 of the mirror retainer 15 has a rear upper end, which is an upper section in the door up-down direction. The patch 22 is arranged such that the center section of the patch 22 covers the rear upper end of the main body 151.

The section modulus of the section of the outer reinforcement 14 to which the main body 151 of the mirror retainer 15 is joined is the sum of the section modulus of the outer reinforcement 14 and the section modulus of the main body 151 of the mirror retainer 15. At the boundary between the section of the outer reinforcement 14 to which the main body 151 of the mirror retainer 15 is joined and the section of the outer reinforcement 14 to which the mirror retainer 15 is not joined, the section modulus may vary abruptly. As a result, when the thicknesses of the outer reinforcement 14 and the mirror retainer 15 are reduced to reduce weight, providing the reinforcing member 18 alone may result in a significant deformation of the combination of the outer reinforcement 14 and the mirror retainer 15 at the boundary between the section where the outer reinforcement 14 and the mirror retainer 15 are joined to each other and the section where they are not joined. This may cause a significant displacement of the door mirror 13 in the front-rear direction.

In contrast, as shown in FIG. 9A, the patch 22 of the second embodiment limits deformation of the combination of the outer reinforcement 14 and the mirror retainer 15 in the front-rear direction, thereby limiting displacement of the door mirror 13 in the front-rear direction. The patch 22 is not shown in FIG. 9A.

In addition to the advantages of the first embodiment, the second embodiment has the following advantage.

(4) The patch 22 extends over the outer reinforcement 14 and the rear end in the door front-rear direction of the main body 151 of the mirror retainer 15. The patch 22 thus extending is joined to the outer reinforcement 14 and the mirror retainer 15. This limits deformation of the section to which the base 13a of the door mirror 13 is coupled (the outer reinforcement 14 and the mirror retainer 15, which are the fastening targets), which would otherwise occur if the section modulus varies abruptly at the boundary between the section of the outer reinforcement 14 to which the main body 151 of the mirror retainer 15 is joined and the section of the outer reinforcement 14 to which the mirror retainer 15 is not joined. The limited deformation limits displacement of the door mirror 13 in the front-rear direction.

(5) The patch 22 covers the rear upper end in the door up-down direction of the main body 151 of the mirror retainer 15. The patch 22 thus effectively limits displacement of the door mirror 13 in the front-rear direction.

The present disclosure is not limited to the above described embodiments, but may be embodied as follows, for example. The above-described embodiments and the following modifications can be combined as long as the combined modifications remain consistent with each other.

The reinforcing member 18 does not have to be joined to the mirror retainer 15 at three surfaces. For example, the reinforcing member 18 may be joined only to the two surfaces of the pair of the upper first facing surface 20a and the lower second facing surface 20b of the mirror retainer 15.

The reinforcing member 18 may be joined only to the two surfaces of the first facing surface 20a of the upper leg 15a and the main body inner surface 19 of the main body 151 of the mirror retainer 15.

The mirror retainer 15 does not have to include the front leg 15c extending substantially parallel to the upper leg 15a. For example, the upper leg 15a may be widened, and the mirror retainer 15 does not have to include the front leg 15c extending substantially parallel to the upper leg 15a.

In the reinforcing member 18, the two surfaces forming each bend 18a do not have to form a right angle, and the surfaces may form an angle larger or smaller than a right angle. The bends 18a may differ from one another in the angle formed by their respective two surfaces.

The reinforcing member 18 does not have to include a plurality of bends 18a and may include only one bend 18a.

The center section of the patch 22 does not have to cover the rear upper end in the door up-down direction of the main body 151 of the mirror retainer 15. For example, the patch may extend over the outer reinforcement 14 and the mirror retainer 15 with the center section of the patch not covering the rear upper end of the main body 151 of the mirror retainer 15.

The invention claimed is:

1. A vehicle door structure comprising:
an outer panel that includes a door beltline and is configured to form an exterior panel of a door;
an inner panel that is configured to form an interior panel of the door;
an outer reinforcement that extends along the door beltline of the outer panel and includes a front end and a rear end, the rear end being joined to the inner panel;
a mirror retainer that includes a main body, an upper leg, and a lower leg, wherein
the main body is joined to the front end of the outer reinforcement with a part of the main body overlapping with the front end of the outer reinforcement,
the main body includes an upper edge and a lower edge in a door up-down direction,
the upper leg is located at the upper edge of the main body and joined to the inner panel,
the lower leg is located at the lower edge of the main body and joined to the inner panel,
the main body includes a main body inner surface on which the upper leg and the lower leg are located,
the upper leg includes a first facing surface facing the lower leg, and
the lower leg includes a second facing surface facing the upper leg; and
a reinforcing member that is connected to the first facing surface and at least one of the main body inner surface and the second facing surface so as to reinforce the mirror retainer.

2. The vehicle door structure according to claim 1, wherein
the reinforcing member is joined at least to the first facing surface and the second facing surface of the mirror retainer,
the upper leg and the lower leg face each other in a facing direction, and
the reinforcing member is configured by a plate-shaped member having a bead extending in the facing direction.

3. The vehicle door structure according to claim 1, wherein the main body of the mirror retainer includes a main body rear end, which is a rear end in a door front-rear direction,
the main body rear end is joined to the outer reinforcement,
a patch is located at the main body rear end and extends over the outer reinforcement and the mirror retainer, and
the patch is joined to the mirror retainer and the outer reinforcement.

4. The vehicle door structure according to claim 3, wherein
the rear end of the main body of the mirror retainer includes a rear upper end, which is an upper section in the door up-down direction, and
the patch at the main body rear end covers at least the rear upper end of the main body.

5. A reinforcement for a vehicle door structure, the vehicle door structure including:
an outer panel that includes a door beltline and is configured to form an exterior panel of a door;
an inner panel that is configured to form an interior panel of the door;
an outer reinforcement that extends along the door beltline of the outer panel and includes a front end and a rear end, the rear end being joined to the inner panel; and
a mirror retainer that includes a main body, an upper leg, and a lower leg, wherein
the main body is joined to the front end of the outer reinforcement with a part of the main body overlapping with the front end of the outer reinforcement,
the main body includes an upper edge and a lower edge in a door up-down direction,
the upper leg is located at the upper edge of the main body and joined to the inner panel, and
the lower leg is located at the lower edge of the main body and joined to the inner panel, wherein
the main body of the mirror retainer includes a main body inner surface on which the upper leg and the lower leg are located,
the upper leg of the mirror retainer includes a first facing surface facing the lower leg,
the lower leg of the mirror retainer includes a second facing surface facing the upper leg, and
the reinforcing member is connected to the first facing surface and at least one of the main body inner surface and the second facing surface so as to reinforce the mirror retainer.

6. A method for manufacturing a vehicle door structure, comprising:
forming an exterior panel of a door with an outer panel that includes a door beltline;
forming an interior panel of the door with an inner panel;
joining a rear end of an outer reinforcement that extends along the door beltline of the outer panel to the inner panel;
preparing a mirror retainer that includes a main body, an upper leg, and a lower leg,
joining the main body to the front end of the outer reinforcement with a part of the main body overlapping with the front end of the outer reinforcement, wherein
the main body includes an upper edge and a lower edge in a door up-down direction,
the upper leg is located at the upper edge of the main body, the lower leg is located at the lower edge of the main body, the main body includes a main body inner surface on which the upper leg and the lower leg are located, the upper leg includes a first facing surface facing the lower leg, and the lower leg includes a second facing surface facing the upper leg; and joining the upper leg to the inner panel;

joining the lower leg to the inner panel;

connecting the reinforcement to the first facing surface; and connecting the reinforcing member to at least one of the main body inner surface and the second facing surface so as to reinforce the mirror retainer.

* * * * *